United States Patent [19]
Geiszler

[11] 3,821,379
[45] June 28, 1974

[54] 1-(P-METHOXYCINNAMOYL)-4-(5-PHENYL-4-OXO-2-OXAZOLIN-2-YL)-PIPERAZINE AS AN ANTI-MALARIAL AGENT

[75] Inventor: Adolph Oscar Geiszler, Mundelein, Ill.

[73] Assignee: Abbott Laboratories, North Chicago, Ill.

[22] Filed: July 26, 1973

[21] Appl. No.: 382,988

Related U.S. Application Data

[63] Continuation-in-part of Ser. No. 263,734, June 8, 1972, abandoned.

[52] U.S. Cl. .............................................. 424/250
[51] Int. Cl. ......................................... H61k 27/00
[58] Field of Search ................................... 424/250

[56] References Cited
UNITED STATES PATENTS
3,752,819  8/1973  Philippe ........................... 424/250

*Primary Examiner*—Jerome D. Goldberg
*Attorney, Agent, or Firm*—Robert L. Miblack; Joyce R. Krei; Vincent A. Mallare

[57] ABSTRACT

A method of suppressing malarial infections using 1-(p-methoxycinnamoyl)-4-(5-phenyl-4-oxo-2-oxazolin-2-yl)-piperazine as the anti-malarial agent.

1 Claim, No Drawings

1-(P-METHOXYCINNAMOYL)-4-(5-PHENYL-4-OXO-2-OXAZOLIN-2-YL)-PIPERAZINE AS AN ANTI-MALARIAL AGENT

CROSS-REFERENCE TO RELATED APPLICATIONS

This application is a continuation-in-part of copending application, Ser. No. 263,734, filed June 8, 1972 and abandoned as of Aug. 25, 1973.

DETAILED DESCRIPTION OF THE INVENTION

This invention relates to a method of suppressing malarial infections using 1-(p-methoxycinnamoyl)-4-(5-phenyl-4-oxo-2-oxazolin-2-yl)piperazine as the anti-malarial agent.

In treating malaria, it is a primary object to promptly destroy the erythrocytic trophozotes and schizontes of Plasmodium that cause the signs and symptons and pathological effects that characterize the disease. While there are several agents available such as quinine, chloroquine, amodiaquine and chlorguanide, there are problems involved with these agents. Chlorguanide has relatively slow action and resistance has rapidly developed to the drug in some areas as with other of the agents. Furthermore, none of these four drugs have any useful direct action on the gametocytes. Therefore, the search for improved anti-malarial agents continues.

This invention is directed toward the use of one such agent.

propriate compounds for intensive preclinical studies.

Utilizing young, non-inbred ICR/AJ Swiss Mice and the standard inoculum of *Plasmodium berghei* KBG 173, it is possible to produce a uniform disease fatal to 100 percent untreated animals within 6 to 8 days with the mean survival time of 6.1 days. Test animals weigh from 18 to 22 grams, but weight variations in any given experimental or control group are confined to 2–3 grams. All animals in any given test are approximately the same age. Animals on test are housed in metal top plastic cages, given a standard laboratory diet and water.

Test animals receive an intraperitoneal injection of 0.5 milliliters of 1:100 dilution of heparinized hearts' blood with a minimum of 90 percent parasitized cells ($4 \times 10^7$ cells) drawn from donor mice infected one week earlier with *Plasmodium berghei*. The donor strain is maintained by weekly passages in separate groups of mice inoculated with a 0.5 ml. of 1:500 dilution hyperanized hearts blood.

The test compounds are usually administered after dissolution or suspension in sesame or peanut oil. A single dose is given subcutaneously 72 hours after the mice are infected with *Plasmodium berghei*. At this time, a 10 to 15 percent parasitemia has developed; the disease is well established but has not produced sufficient ability to alter the response of the host to toxic effects of the drug on test.

The following table summarizes the results of the rodent anti-malarial test for 1-(p-methoxycinnamoyl)-4-(5-phenyl-4-oxo-2-oxazolin-2-yl)piperazine.

ANTI-MALARIAL ACTIVITY OF 1-(p-METHOXYCINNAMOYL)-4-(5-PHENYL-4-OXO-2-OXAZOLIN-2-YL)PIPERAZINE IN THE BLOOD INDUCED MOUSE TEST

| Dose mg./kg. | Daily Mortality (Day after infection/deaths) | | | | | Mean Survival Time (Drug) | Mean Survival Time (Control) |
|---|---|---|---|---|---|---|---|
| 160 | 11/01 | 12/01 | 13/01 | 14/01 | 15/01 | 13.0 | 6.1 |
| 320 | 12/01 | 13/01 | 15/01 | 16/01 | 19/01 | 15.0 | 6.1 |
| 640 | 16/01 | 20/02 | 21/02 | | | 19.6 | 6.1 |

The compound useful in the practice of this invention, 1-(p-methoxycinnamoyl)-4-(5-phenyl-4-oxo-2-oxazolin-2-yl)-piperazine, is represented by the following structure:

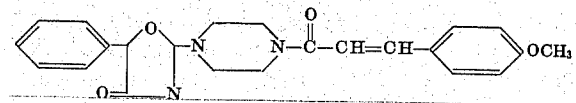

In the practice of this invention, 1-(p-methoxycinnamoyl)-4-(5-phenyl-4-oxo-2-oxazolin-2-yl)piperazine is administered to patients suffering from malaria in dosages of from 160 to 640 mg./kg. of body weight daily, preferably in divided dosages, i.e., three to four times a day.

The anti-malarial activity of the compound was first established in the blood induced mouse test which is carried out as follows: this test system is based on comparisons of responses to test compounds by *Plasmodium berghei* KBG 173 Malaria in Mice as expressed in mean survival times and the mean survival times of untreated controls. Thus, compounds noted as active produce increases in the survival times of the treated animals that are significant when compared with the survival times of untreated controls. Since an established disease is less sensitive to treatment than a disease in the early stages of development, treatment is withheld until the parasitemia is relatively high in order to assure more reliable assay of activity and the selection of ap- The compound useful in the practice of this invention was prepared as follows:

A mixture of 5 g. of p-methoxycinnamic acid, 2 ml. phosphorous trichloride and 25 ml. benzene was stirred and refluxed for 1 hour. The hot mixture was filtered and the filtrate evaporated in vacuo. The residue was dissolved in 15 ml. N,N-dimethylacetamide and added dropwise to a stirred solution of 3.9 g. of 1-(5-phenyl-4-oxo-2-oxazolin-2-yl)piperazine and 1.6 g. of triethylamine in N,N-dimethylacetamide. The mixture was stirred at room temperature for 2 hours and filtered. The filtrate is diluted with water and the product collected and recrystallized from 3A ethanol, m.p. 211°–212°.

Analysis Calcd. for $C_{23}H_{23}N_3O_4$: C, 68.13; H, 5.72; N, 10.37

Found: C, 67.87; H, 5.92; N, 10.53

The compound useful in the practice of this invention can be formulated into various pharmaceutically acceptable dosage forms such as tablets, capsules, pills and the like, for immediate or sustained release, by combining the compound with a suitable pharmaceutically acceptable carrier or diluent according to methods well known in the art. Such dosage forms may additionally include lubricants, excipients, binders, fillers, flavoring and sweetening agents and other therapeutically inert ingredients necessary for the formulation of the desired preparation.

I claim:

1. A method of suppressing malarial infections comprising administering a therapeutically effective amount of 1-(p-methoxycinnamoyl)-4-(5-phenyl-4-oxo-2-oxazolin-2-yl)piperazine, to a patient in need of such treatment.

* * * * *